United States Patent [19]

Lear et al.

[11] Patent Number: 4,924,820
[45] Date of Patent: May 15, 1990

[54] EXHAUST GAS TREATMENT FOR A TWO STROKE ENGINE

[75] Inventors: Mark Lear, Tauranga, New Zealand; Christopher K. Schlunke, Kingsley; Kenneth P. Seeber, Wanneroo, both of Australia

[73] Assignee: Orbital Engine Company Proprietary Limited, Balcatta, Australia

[21] Appl. No.: 354,402

[22] PCT Filed: Sep. 5, 1988

[86] PCT No.: PCT/AU88/00343

§ 371 Date: Jul. 5, 1989

§ 102(e) Date: Jul. 5, 1989

[87] PCT Pub. No.: WO89/02029

PCT Pub. Date: Mar. 9, 1989

[30] Foreign Application Priority Data

Sep. 4, 1987 [AU] Australia .............................. PI4154
Oct. 26, 1987 [AU] Australia .............................. PI5103

[51] Int. Cl.$^5$ .................................................. F01N 3/28
[52] U.S. Cl. .................................. 123/65 PE; 60/302
[58] Field of Search ............... 123/65 P, 65 PE, 323; 60/282, 295, 299, 302, 314

[56] References Cited

U.S. PATENT DOCUMENTS

| | | | |
|---|---|---|---|
| 4,175,107 | 11/1979 | Iwaoka et al. | 422/114 |
| 4,195,063 | 3/1980 | Iwaoka et al. | 422/180 |
| 4,646,516 | 3/1987 | Bostock | 60/302 |
| 4,663,934 | 5/1987 | Sickels | 60/311 |
| 4,735,046 | 4/1988 | Iwai | 60/297 |
| 4,848,082 | 7/1989 | Takahashi et al. | 60/285 |

FOREIGN PATENT DOCUMENTS

| | | | |
|---|---|---|---|
| 0024616 | 2/1977 | Japan | 60/302 |
| 0063509 | 5/1977 | Japan | 60/302 |
| 0203814 | 12/1982 | Japan | 60/302 |

*Primary Examiner*—David A. Okonsky
*Attorney, Agent, or Firm*—Armstrong, Nikaido, Marmelstein, Kubovcik & Murray

[57] ABSTRACT

A two-stroke spark ignited engine (10) with direct fuel injection (14) and an exhaust gas treatment catalyst. A separate catalyst unit (23) is provided for each combustion chamber (11) and is located at or adjacent each exhaust port (15) from that chamber and that during a cycle of each combustion chamber (11) the catalyst unit (23) of that combustion chamber (11) is exposed only to exhaust gases which change from chemically reducing to chemically oxidizing during the cycle. An engine which has exhaust gases which are overall chemically oxidizing can thus nevertheless have the NOx constituents of the gases reduced.

11 Claims, 5 Drawing Sheets

EXHAUST GAS TREATMENT FOR A TWO STROKE ENGINE

This invention relates to the controlling of exhaust gas emissions from internal combustion engines by the use of catalysts to convert the undesirable components of the engine exhaust gas.

Environment protection authorities in various countries prescribe limits to the emissions in the exhaust gases of motor vehicles and usually the limits places on emissions from private cars, motor cycles and light commercial vehicles are more strict than those applicable to trucks and other heavy commercial vehicles. In most countries the permissible levels of emissions for automotive vehicles are stipulated on the basis of the weight of various components of the exhaust gas per mile or kilometre travelled, the limits apply irrespective of the weight of the vehicle or the size of the engine thereof. Accordingly, there has been a trend towards the production of small motor vehicles of relatively light weight whereby the rate of consumption of fuel can be reduced with a corresponding reduction in the weight of the various exhaust gas components generated per unit distance travelled.

The three major components of the exhaust gas which must be controlled are the hydrocarbons (HC) oxides of nitrogen (NOx) and carbon monoxide (CO). NOx is normally treated by a catalyst that requires the establishment of a reducing environment within it to separate the oxygen from the nitrogen.

The use of catalysts in the exhaust systems of vehicle internal combustion engines is widely known and practised in the control of exhaust gas emissions. It is customary to locate the catalyst elements in the exhaust system somewhat downstream from the actual exhaust port of the cylinder or cylinders of the engine where the exhaust gases from any one cylinder or from a number of cylinders will have been subject to a degree of mixing between the time of leaving the cylinder and reaching the catalyst. Accordingly, the distribution of the various components of the exhaust gas is approaching a homogeneous mixture when presented to the catalysts.

It is known, shown in SAE Paper 872098, relating to investigations by the Toyota Central Research and Development Laboratories, Inc., that the efficiency of conversion of a three-way catalyst system applied to an automotive type four stroke cycle engine is substantially dependent upon the air-fuel ratio of the exhaust gas presented to the catalyst and in particular that the efficiency dramatically changes as the air/fuel ratio transits the stoichiometric ratio. As can be seen from the graph constituting FIG. 1 of the accompanying drawings, the efficiency of conversion of HC increases as the air/fuel ratio of the exhaust gas increases, that is as the mixture gets leaner. In contrast, the efficiency of the conversion of NOx is high, whilst the air/fuel ratio is low, that is, with a rich exhaust gas mixture, but drops most dramatically as the air/fuel ratio passes through stoichiometric from a rich to a lean mixture.

The above referred to SAE Paper discusses the results of an experiment carried out on a manifold injected six cylinder four stroke cycle engine, wherein the air/fuel ratio was artificially cycled at a frequency of 1 Hz and it was found that this cyclic variation of the air/fuel ratio had some detrimental effects on the NOx conversion efficiency with rich mixtures and an improvement in the conversion with lean mixtures. More importantly, it was shown that the cycling of the mixture ratio reduced the sensitivity of the conversion efficiency to air/fuel ratios so that there was a decrease in the rate of change in NOx conversion efficiency as the air/fuel ratio transits the stoichiometric value. This improvement in the conversion of NOx is shown in FIG. 2 of the accompanying drawings. The results represented in the SAE Paper were achieved by an artificial cycling of the air/fuel ratio by an adaption of the fuelling rate control programme of the fuel injection system for the purpose of the experiments. The adaption of the fuelling rate was arranged to achieve the desired air/fuel ratio in the exhaust gas immediately upstream of the catalyst, not necessarily taking any account of the efficient operating of the engine. The catalyst was presumably located in the conventional position in the exhaust system where the exhaust gas from all cylinders of the engine were treated by the single catalyst.

Engines operating on the two stroke cycle have presented a substantial problem in the control of the level of exhaust emissions, particularly in engines where fuel is entrained in the air charge when it enters the engine cylinder, as part of that fuel passes unburnt through the exhaust port during the conventional scavenging process of the cylinder of a two stroke cycle engine. This escape of unburnt fuel can be reduced by modern electronically controlled fuel injection systems that inject fuel directly into the engine cylinder rather than being carried into the cylinder with the incoming air charge.

However, the direct injection of the fuel does not in itself contribute significantly to the control of the generation of Nox, particularly as the rate of fuel consumption increases with the increase in size of the vehicle resulting in a corresponding increase in the level of NOx emissions when measured on a mass per distance unit travelled basis. Although other combustion control techniques can also be employed to contribute to the control of the level of NOx in small horse power engines, the multiplication of the level of NOx generated with increasing power output, leads to a situation where the control of NOx is best exercised by way of catalytic treatment of the exhaust gases particularly from the considerations of cost and stability of operation.

In a direct injected two stroke cycle engine, the fuel free fresh charge which enters the engine cylinder whilst the exhaust port is still open, results in a dilution of the subsequently expelled exhaust gases to an air/fuel ratio considerably above stoichiometric, thus resulting in oxidising conditions existing in the exhaust system which are in direct conflict with the desired reducing conditions necessary to achieve effective reduction of the NOx by catalytic treatment. Accordingly the provision of the catalyst in the exhaust system in the conventional location to treat the exhaust gases from all cylinders of the engine, would only result in the exhaust gases being subjected to oxidation conditions. This would contribute to a lowering of the HC, but would not break down the NOx.

It is an object of the present invention to improve the performance of a reducing catalyst in the treatment of the exhaust gases in a two stroke cycle internal combustion engine to reduce the presence of oxides of nitrogen.

With this object in view, there is provided according to the present invention a two stroke cycle spark ignited internal combustion engine having for each combustion chamber an injector means to deliver fuel directly to the combustion chamber, an exhaust port through which gases from the combustion chamber to an exhaust system, and an inlet port through which a fresh charge of air enters the combustion chamber, the inlet and exhaust ports being arranged so that the inlet port opens prior to the closing of the exhaust port, characterised in that there is provided catalyst means at or adjacent to each exhaust port at a location so that while the exhaust port is open, the catalyst means receives substantially only the gases that have been exhausted through that exhaust port, whereby the catalyst means will during each exhaust port open period alternately receive chemically reducing and chemically oxidising gases, the catalyst means including an active catalyst material of a nature to reduce oxides of nitrogen (NOx) in the gas received from the exhaust port.

Conveniently, the catalyst means is located in a passage extending from the exhaust port to an exhaust gas manifold communicating with respective exhaust ports of a plurality of cylinders of the engine, that end of the catalyst means closest to the exhaust port being spaced therefrom so that when the exhaust port is open the air/fuel ratio of the exhaust gas at said end of the catalyst means is not substantially different from that at the exhaust port.

Preferably the active material of the catalyst means varies in chemical composition in the direction of the extent of the exhaust port parallel to the axis of the cylinder, the active material at least at that end of the exhaust port first exposed during the opening of the exhaust port being of a reducing nature.

The direct injection of the fuel into the combustion chamber contributes to the establishment of the variation in the chemical composition of the exhaust gas at the exhaust port and also reduces the fuel losses through the exhaust port to improve fuel efficiency. Accordingly by positioning the catalyst in the exhaust system immediately adjacent the exhaust port, the catalyst will then experience a variation in the air/fuel ratio of the exhaust gas, and advantage can thereby be taken of the improved operation of the catalyst system when subject to cyclic variations in air/fuel ratio of the exhaust gases without the need to artificially create such cycling of the air/fuel ratio.

There is also provided by the present invention a method of operating a two-stroke cycle spark ignited internal combustion engine including introducing a fresh charge of air through an inlet port into a combustion chamber, injecting fuel into the air while it is in the combustion chamber, igniting the combustible mixture so produced, passing exhaust gases from the combustion chamber through an exhaust port to an exhaust system, providing at or adjacent the exhaust port catalyst means having an active catalyst material of a nature to reduce oxides of nitrogen in the gases, contacting the catalyst means with the exhaust gases substantially only from that combustion chamber, and controlling the introduction of the fresh charge of air, the fuel injection and the flow of exhaust gases such that during each open period of the exhaust port of the combustion chamber, the catalyst means is exposed alternately to chemically reducing and chemically oxidising gases.

The location of the catalyst means at or immediately adjacent to the exhaust port results in the active catalyst material being exposed to the variations in composition of the exhaust gas leaving the cylinder before the gas has had an opportunity to mix within itself or with exhaust gas from another cylinder to a significant degree so as to approach a homogeneous composition.

The gas passing from the cylinder upon initial opening of the exhaust port, and prior to the opening of the inlet port, is the combustion gas arising from the burning of the fuel and air mixture in the cylinder, and is chemically reducing. In particular when NOx is high, the fuel/air mixture is relatively fuel rich, such a mixture will correspond to a stoichiometric or lower air/fuel ratio and is therefore chemically reducing. Further the NOx component of the exhaust gas is principally present in the gas released from the exhaust ports upon initial opening thereof, and so the high temperature thereof, the chemically reducing condition of the gases and the catalyst all promote the breakdown of the NOx.

The gases passing out through the exhaust port after the opening of the inlet port are by comparison fuel lean, as they include part of the fresh air charge entering the cylinder which is fuel free, and so the exhaust gas has an air/fuel ratio considerably higher than the stoichiometric ratio, and is therefore chemically oxidising. However, the cycling of the air/fuel ratio of the exhaust gas of each cylinder, once each cylinder cycle, between lean and rich, has the effect of providing a good efficiency of conversion of NOx, even though as typically represented in FIG. 2 the average air/fuel ratio is somewhat above stoichiometric.

Preferably the catalyst means is a suitable carrier or substrate loaded with a catalyst material that will effect reduction of the NOx. As is common practice the catalyst material is preferably a mixture of active materials and also includes active materials that will promote oxidation of some components of the exhaust gas. The active materials may include rhodium platinum or paladium which are effective in breaking down NOx to nitrogen and oxygen.

At the loads and speeds normally encountered in engine operation, such as those of significance to the driving cycle test procedures for an automobile engine, the following sequence of events will occur after the exhaust port opens on the expansion or exhaust stroke of a two stroke cycle spark ignition internal combustion engine operating as proposed by the present invention:

1. Initially the high temperature gases which have been trapped in the cylinder and have taken part in the combustion process will escape from the cylinder through the exhaust port and travel through the catalyst means to some extent. In the regions of operation of an automotive engine that produce high levels of NOx these gases generally have an air/fuel ratio which is stoichiometric or richer and the temperature of the gases is high. Ideal conditions for the reduction of NOx are thus generated at the catalyst because of the reducing nature of the rich feed gas and the high temperature.
2. Subsequent to the passage of this high temperature, rich gas, as a result of the inlet port being opened and fresh air being allowed to enter the cylinder, a mixture of exhaust gas and fresh scavenging air at a lower temperature will pass from the cylinder onto the catalyst. This feed gas to the catalyst will be lean, above stoichiometric, because of the presence of fresh air. Accordingly, the catalyst is operating in an oxidising atmosphere, which is ideal for the oxidation of HC, but also can degrade the ability of the catalyst material to reduce NOx emissions.
3. Upon closure of the transfer and exhaust ports, the scavenging process concludes and the flow of gas through the catalyst falls to almost zero.

4. This cycle (1-2-3) commences again upon the next opening of the exhaust port with the flow of hot, rich gas through the catalyst. The high temperature reducing atmosphere so created at the catalyst has the effect of restoring the ability of the catalyst to reduce NOx.

It is therefore seen that an exhaust gas having an overall air/fuel ratio that is lean and therefore chemically oxidising can have the NOx constituents thereof catalytically reduced by the combination of the time variant temperature and composition of the exhaust gas and the mounting of a suitable catalyst close to the exhaust port.

A flow reversal or a number of flow reversals may occur at the exhaust port at some engine speeds, depending on the design of the exhaust system, and the gas may therefore experience a number of passes over the catalyst material during each cycle, a further advantage of locating the catalyst in the exhaust port.

The invention will be more readily understood from the following description of several practical applications of the invention with reference to the accompanying drawings.

Figure 3:
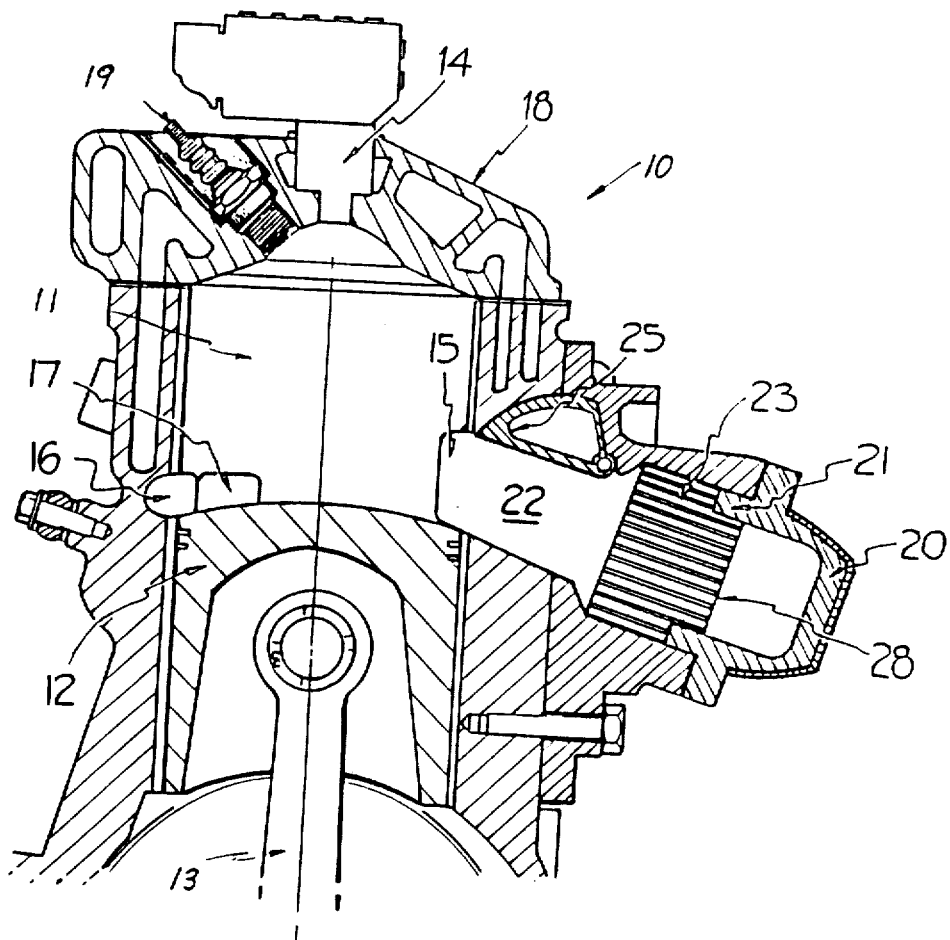
FIG. 3 is a diagrammatic sectional view of part of one cylinder of a three cylinder inline two stroke cycle spark ignited engine incorporating the present invention.

Referring now to FIG. 3, the two stroke cycle spark ignited engine 10 has a cylinder 11 in which the piston 12 reciprocates, the latter being connected by the rod 13 to a crankshaft (not shown). The engine operates on the conventional two stroke cycle and incorporates for each cylinder 11 a spark plug 19 and a fuel injector 14 located in the cylinder head 18 to introduce fuel directly into its respective combustion chamber. The cylinder 11 has an exhaust port 15 in one side and transfer ports 16, 17 in the opposite side.

As is known in the art of two stroke cycle engines, it is customary to provide a number of inlet or transfer ports through which the air charge enters the cylinder, and customarily there is only a single exhaust port. Again, as is common practice in two stroke cycle engines, the movement of the piston in the cylinder controls the opening and closing of the inlet and exhaust ports, with the relative disposition and dimensions of the respective ports being such that the exhaust port opens prior to the opening of the transfer ports, and the inlet port clsing prior to the exhaust port. Thus there is a period when both the inlet and exhaust ports are open to achieve effective scavenging of the cylinder.

The exhaust manifold 20 communicates with the exhaust port of each of the cylinders of the engine and with a common exhaust pipe (now shown). The manifold 20 is attached to the engine by appropriate attachment bolts or fastenings so that the spigot portion 21 is received within the passage 22 extending from the exhaust port 15 to hold the reduction catalyst unit 23 in position in the passage 22.

The reduction catalyst unit 23 is of generally conventional composition having a base structure of a suitable ceramic or metallic material providing a multitude of passages. The exposed surfaces of the passages are coated with a suitable reduction promoting material, such as palladium or rhodium, so as to be in intimate contact with the exhaust gases passing through the reduction catalyst unit 23.

It will be appreciated that in the construction shown, the catalyst unit 23 only receives exhaust gases from the cylinder 11 via the exhaust port 15, the close proximity of the catalyst unit to the exhaust port ensuring that the composition of the exhaust gas passing through the catalyst unit 23 is substantially the same as that of the exhaust gas as it leaves the cylinder 11 through the exhaust port 15.

In the construction shown a pivotally mounted power valve 25 (shown fully open) is provided to cooperate with the exhaust port 15 in a known manner, and the presence of the power valve 25 necessitates the spacing of the catalyst unit 23 to a small distance downstream from the exhaust port 15. The valve 25 does not completely obstruct gas flow at any stage in the engine's operation but instead serves under some conditions to restrict flow and to alter the timing of the exhaust port opening and closing. Also, the valve 25 does not alter its position during each combustion cycle, but moves instead with changes in engine operating conditions. Such valves and their operation are known to those skilled in the design of modern two stroke engines, and an example is described in Australian patent application No. 57898/86, which is incorporated herein by reference.

In an engine where no exhaust valve is provided, the catalyst unit 23 may be located much closer to the exhaust port 15. The exact location of the reducing catalyst unit 23 can be determined for each engine construction and, as previously indicated, the desirable factors regarding the location of the reducing catalyst unit 23 are that it is substantially only exposed to the gases discharged from one cylinder of the engine through the relevant exhaust port, those gases varying in air/fuel ratio each engine cycle to provide both reducing and oxidising conditions. As the major part of the NOx component of the exhaust gas is in that portion of the exhaust gas that passes through the exhaust port at opening thereof and shortly thereafter. Accordingly, the catalyst unit may be constructed so as to only extend over part of the extent of the export port, conveniently over the half first opened.

It will be appreciated that the outermost face 28 of the reduction catalyst unit 23 will be exposed to other exhaust gases within the exhaust manifold 20. However, there will be no significant flow of such gases through the reducing catalyst unit 23, and accordingly such exposure to the exhaust gas from other cylinders will not have any significant bearing on the operation of the reducing catalyst unit 23.

Figure 7:
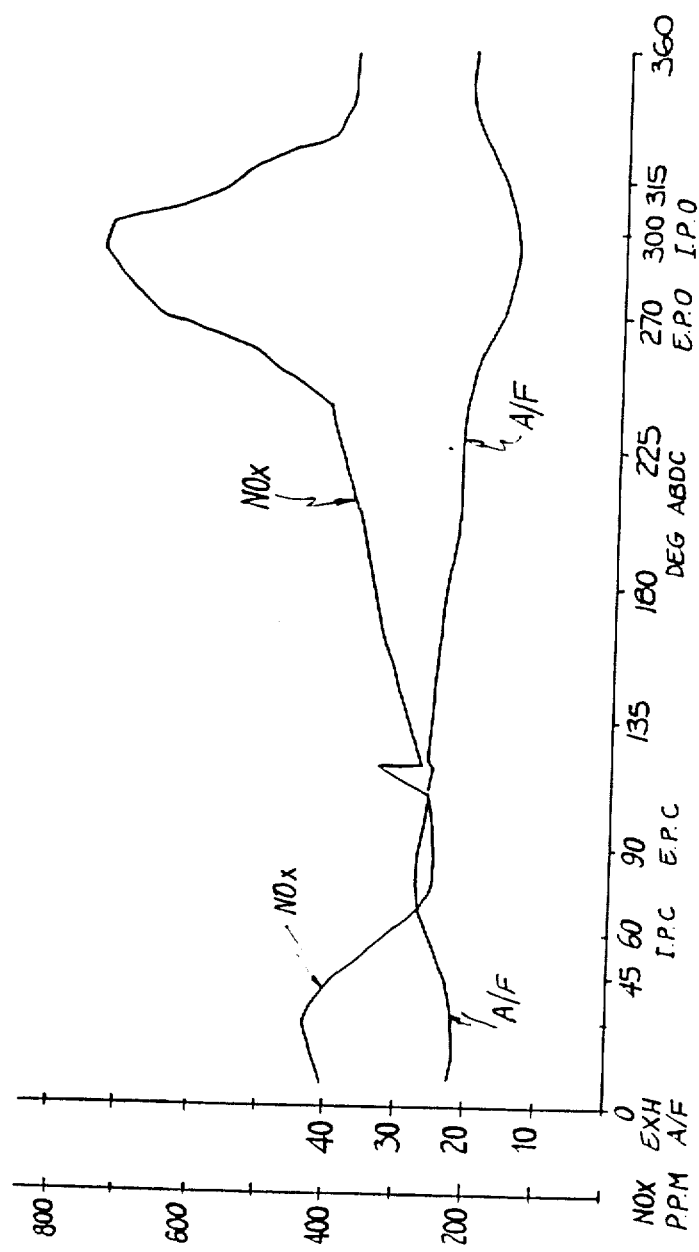
FIG. 7 is a graph of the variation of the air/fuel ration and HC and NOx content of the exhaust gas at the exhaust port in the cylinder as shown in FIG. 3.

FIG. 7 of the drawings illustrates the variation in air/fuel ratio and NOx content of the exhaust gas from a typical two stroke cycle spark ignited engine with a direct fuel injection system, such as that above described with reference to FIG. 3 or the drawings. In this particular engine, the exhaust port opens 270° after bottom dead centre, and closes 90° after bottom dead centre, whilst the inlet or transfer ports 16 and 17 open 300° after bottom dead centre and close 60° after bottom dead centre.

It is seen from the graphs in FIG. 7 that at the time of opening of the exhaust port, the level of NOx in the exhaust gas is high and at the same time the air/fuel ratio is at its lowest, being close to the stoichiometric ratio. The high NOx content of the exhaust gas at opening of the exhaust port provides a highly reducing chemical condition to enable the catalyst to effectively reduce the NOx so as to release the oxygen therefrom. As the period of opening of the exhaust port continues and after the opening of the inlet port, the air/fuel ratio rises significantly, indicating that the exhaust gases are now lean, with a small fuel content thus providing oxidation conditions at the catalyst in the exhaust port.

Figure 1:
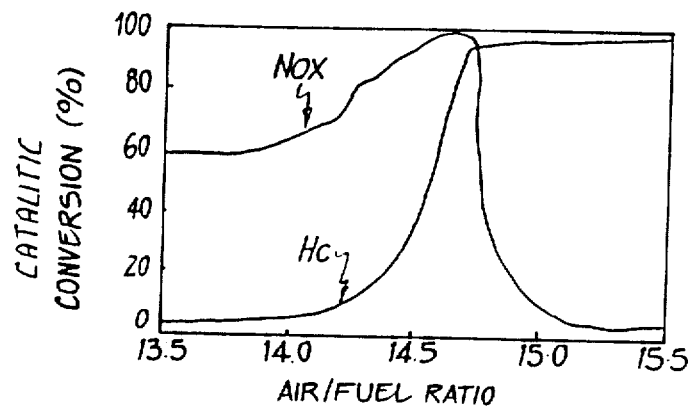
FIG. 1 is a graph showing the normal variation of cnversion efficiency of a three way catalyst with the air/fuel ratio of the four stroke cycle engine exhaust gas when the air/fuel ratio is static.
Figure 2:
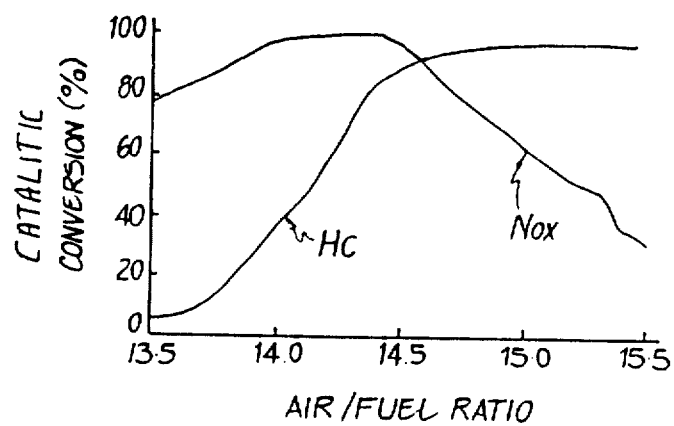
FIG. 2 is a graph of conversion efficiency of the same engine as in FIG. 1, where the nominal air/fuel ratio is cyclicly varied ± 6% from the nominal ratio.

It is seen from the graphs in FIG. 7 that the two stroke spark ignited engine with direct in cylinder fuel injection exhibits a cycling of the air/fuel ratio of the exhaust gases as presented to the catalyst when the catalyst is located in the immediate vicinity of the exhaust port and thus the improvement in the efficiency of the catalyst to convert NOx, as seen by a comparison of FIGS. 1 and 2, is experienced by the catalyst so as to improve the overall efficiency of the control of emissions from the engine.

Figure 4:
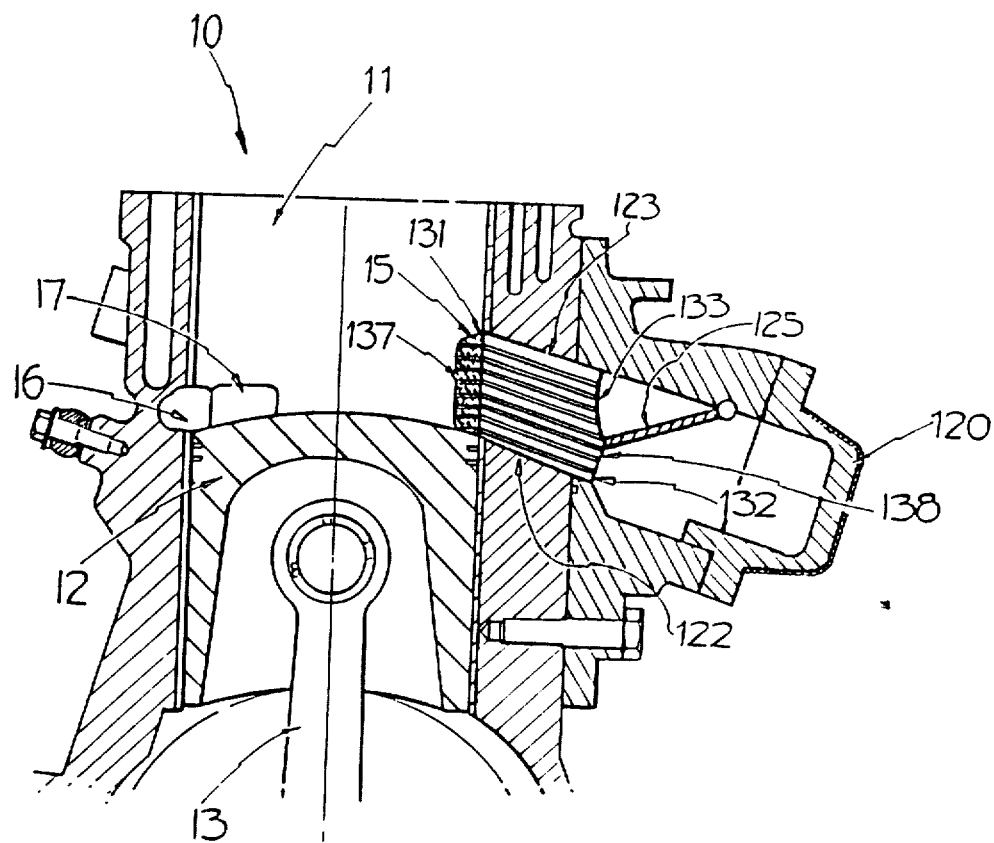
FIGS. 4 and 5 are similar views to FIG. 4 of the one cylinder of the engine with modifications to the exhaust port configuration.

Referring now to FIG. 4, an alternative configuration of an exhaust manifold 120, exhaust port valve 125 and catalyst unit 123 is shown. The valve 125 is shown in FIG. 3 in the position where it most obstructs the flow of gases through the exhaust port 15.

Catalyst unit 123 is constructed with its inboard face 137 shaped in conformity with the internal face of cylinder 11 and contiguous with the piston 12 as it reciprocates. The catalyst unit 123 extends along the exhaust passage 122 and allows free movement of gases along its length from the exhaust port 15 to the exhaust manifold 120. However, it is constructed with internal channels such that gas flow within the catalyst unit cannot occur to a significant extent in a direction parallel to the axis of the engine cylinder 11. Thus, exhaust gases entering the top 131 of the inboard face 137 of the catalyst unit 123 when the descending piston 12 first exposes the exhaust port 15 cannot exit from the lower portion 132 of the outboard face 138 of the catalyst unit into the manifold 120.

The upper portion 133 of the outboard face 138 of the catalyst unit 123 carries a face of part-cylindrical form contiguous with the sweep of the tip of the valve 125. Due to the nature of the sealing effect of the valve 125 against the outboard face 138, and against the side walls of the exhaust passage 122, when the valve is in the position shown in FIG. 4, gases entering the top 131 of the inboard face 137 of the catalyst unit cannot pass through into the exhaust manifold 120. In this way the valve 125 can have the same effect on exhaust port timing as that of valve 25 in the embodiment of FIG. 3 with the added advantage that the catalyst unit 123 is positioned closer to the engine cylinder 11 with consequent improved effectiveness. The positioning of the catalyst unit 123 hard up against the exhaust port 15 and between the exhaust port and the valve 125 also allows the use of a simpler construction of valve 125 in comparison with valve 25, as the latter must have a complex shape so that it seals with the curve of the piston at all positions of the valve's movement which is at an axis at right angles to the piston's axis.

Figure 5:
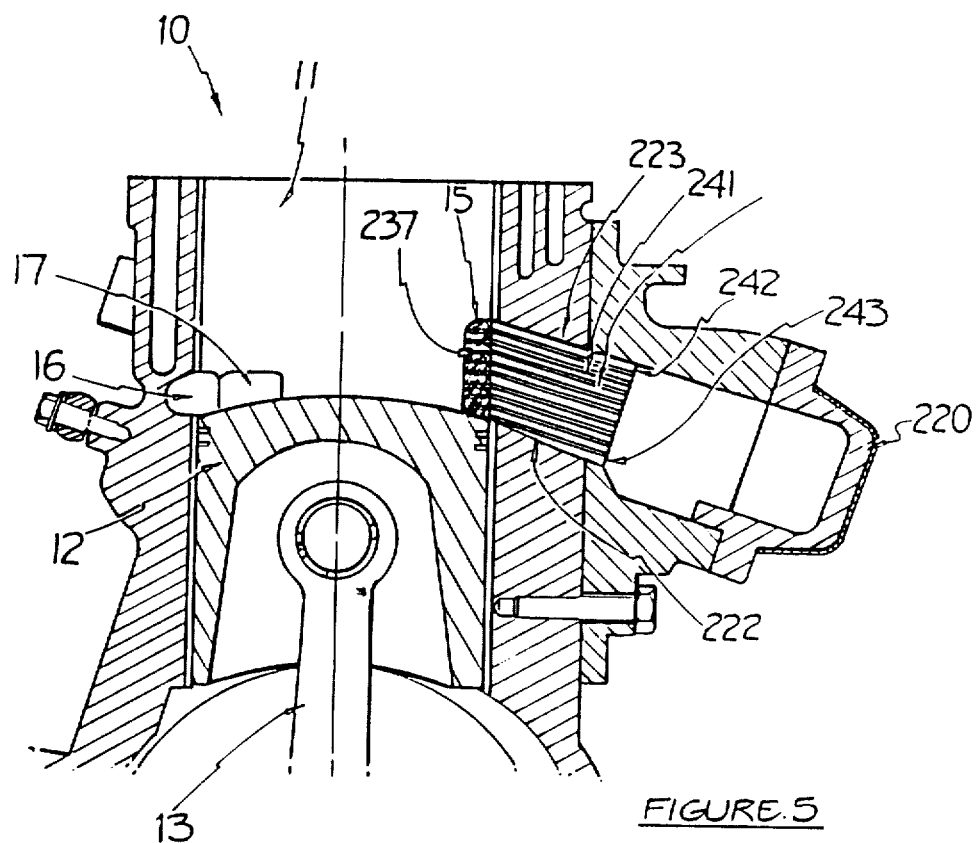

FIG. 5 illustrates another embodiment of the invention in an engine similar to that of FIG. 4 but without an exhaust valve. The catalyst unit 223 is mounted in the exhaust passage 222 with its inboard surface 237 shaped to the form of the wall of the cylinder 11 so that it is contiguous with the piston 12 as the piston covers the exhaust port 15. In this respect the inboard surface 237 has the same form as the surface 137 of the catalyst unit 123 shown in FIG. 4.

The catalyst unit 223 allows free movement of gases along its length from the exhaust port 15 to the exhaust manifold 220. However, as is the case with the catalyst unit 123 in FIG. 4, the catalyst unit 223 is constructed with internal channels such that the gas flow within the catalyst unit cannot occur to a significant extent in a direction parallel to the axis of the engine cylinder 11.

The catalyst unit 223 is constructed such that its upper portion as seen in FIG. 5 is loaded primarily with reducing catalyst and its lower portion is loaded primarily with an oxidising catalyst. This is achieved by having the catalyst unit constructed from a number of sheet elements 241 stacked upon each other, in such a way that they vary in catalytic activity from sheet to sheet in a regular manner, with the sheet elements at the top having only a reducing catalyst coating, those at the bottom having only an oxidising catalyst coating and those toward the centre having a coating of both oxidising and reducing catalyst.

Figure 6:
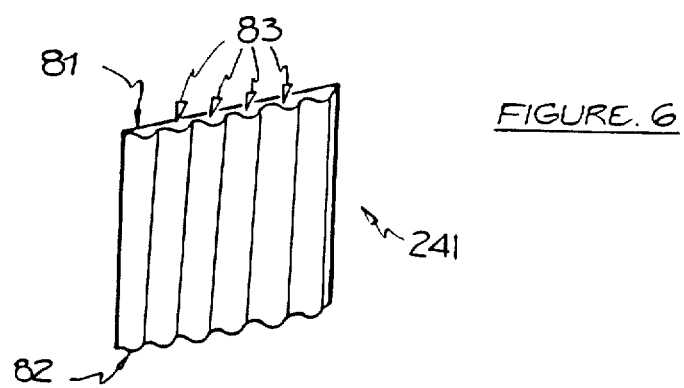
FIG. 6 is a diagrammatic arrangement of one element of a catalyst unit suitable for use in the exhaust port of the engines shown in FIGS. 3 to 5.

Each sheet element 241 is cut from catalytic substrate of the generally known physical form shown in FIG. 6, where a flat metallic sheet 81 is bonded to a corrugated metallic sheet 82, leaving channels 83 between them. Due to the curved walls of the exhaust passage 222 adjoining sheet elements are different sizes.

The substrate of the sheets 81 and 82 is coated with a thin layer of catalytically active material. The upper sheet element 242 has a coating high in rhodium content while the lower sheet element 243 has a coating high in platinum content. The intermediate sheet elements have a coating which is a combination of rhodium and platinum, each sheet element with a different rhodium to platinum ratio, and this ratio varying gradually between the extremes of the upper and lower elements 242 and 243.

During operation of the engine as shown in FIG. 5 when a stratified charge is produced in the combustion chamber, as the piston moves down and commences to open the exhaust port 15, the first exhaust gases to pass through the port are high in NOx, and are channelled through the catalyst unit 223 in content with the upper sheet element 242 with its high rhodium content that acts to reduce the NOx levels. As most of the chemically reducing exhaust gases high in NOx are passed out through the exhaust port 15 while the piston 12 is still in the process of uncovering the exhaust port, these gases are exposed to catalyst sheet elements 241 which have a relatively high ability to reduce the NOx. As the exhaust port opens further, and the inlet port starts to open to admit fresh air to the cylinder, the exhaust gases are then chemically oxidising and are also able to pass through the catalyst unit in contact with any of the sheet elements 241, including the lower sheet element 243. These exhaust gases therefore have a greater opportunity for exposure to the oxidising catalyst component of the catalyst unit.

It will be appreciated that following the exposure of the reducing catalyst component to the oxidising gases, there will be a tendency for deactivation of that catalyst. The subsequent exposure of the catalyst to the hot reducing exhaust gases during the early part of the following exhaust phase, will serve to reactivate the catalyst.

In an alternative arrangement sheet elements 241 with only two different catalyst coatings are required. One group of elements with one catalytic coating of a dominant reducing activity are placed in the upper part of passage 222, and another group of elements with another catalytic coating of a dominant oxidising activity are placed in the lower part. It will be appreciated that this allows significant cost savings over the earlier described embodiment which uses many different coating chemistries on the sheet elements to provide a gradual transition of catalytic activity, but it will also be appreciated that the abrupt change of catalyst type results in lower overall catalyst performance.

Due to the curved walls of the exhaust passage 222, adjacent sheet elements 241 are different widths transverse to the channels 83 in order that, when stacked together, they completely fill the cross section of the passage.

The two stroke cycle engines as above referred to with reference to the accompanying drawings, are each provided with a fuel injection system whereby the fuel is injected directly into the engine cylinder, and a preferred version of such system is described in Australian patent application No. 79821/87, which is incorporated herein by reference.

In the embodiments described, the fuel injector nozzle is located in the cylinder head in the vicinity of the spark plug, which is advantageous in establishing stratified charge conditions in the cylinder, particularly at low fuelling rates such as exist at idle. It will be appreciated that the fuel injected into the cylinder preferably should not to a significant extent become entrained in the air entering through the inlet port while the export port is still open.

Under idle conditions it is possible that all the exhaust gases, as they pass through the exhaust port, are chemically oxidising. It is understood that while operating the engine under such conditions, for the limited period concerned, the catalyst may not experience any chemically reducing exhaust gases at any time in the engine cycle.

However, for normal engine operation, the air/fuel ratio of portion of the gases leaving the cylinder through the exhaust port is to be below stoichiometric (rich) to present reducing gases to the catalyst and for another portion the air/fuel ratio is above stoichiometric (lean) to present reducing gases. In achieving this desired air/fuel ratio use may be made of the normal controls of the fuel injection systems including injection timing, fuel spray pattern and fuel spray penetration. Also control of the gas flow in the cylinder may be used, a suitable method of such control being disclosed in Australian patent application No. 57898/86 and corresponding Belgian Pat. No. 904,818, the disclosures in each of which are incorporated herein by reference.

We claim:

1. A two stroke cycle spark ignited internal combustion engine having for each combustion chamber an injector means to deliver fuel directly to the combustion chamber, an exhaust port through which gases pass from the combustion chamber to an exhaust system, and an inlet port through which a fresh charge of air enters the cylinder, the inlet and exhaust ports being arranged so that the inlet port opens prior to the closing of the exhaust port, characterised in that there is provided catalyst means at or adjacent to each exhaust port at a location so that while the exhaust port is open, the catalyst means receives substantially only the gases that have been exhausted through that exhaust port, whereby the catalyst means will during each exhaust port open period alternately receive chemically reducing and chemically oxidizing gases, the catalyst means including an active catalyst material of a nature to reduce oxides of nitrogen (NOx) in the gases received from the exhaust port.

2. An engine as claimed in claim 1, wherein the catalyst means is located in a passage extending from the exhaust port to an exhaust gas manifold communicating with respective exhaust ports of a plurality of cylinders of the engine, that end of the catalyst means closest to the exhaust port being spaced therefrom so that when the exhaust port is open the air/fuel ratio of the exhaust gas at said end of the catalyst means is not substantially different from that at the exhaust port.

3. An engine as claimed in claim 1 or 2, wherein the active material of the catalyst means varies in chemical composition in the direction of opening of the exhaust port, the active material at least at that end of the exhaust port first exposed during the opening of the exhaust port being of a reducing nature.

4. An engine as claimed in claim 3, wherein the chemical composition of the active material changes once in said direction of opening of the exhaust port in.

5. An engine as claimed in claim 3, wherein the chemical composition of the active material changes progressively in in said direction of opening of the exhaust port.

6. An engine as claimed in claims 1 or 2, wherein the catalyst means is located so one end thereof is substantially contiguous with the periphery the exhaust port.

7. An engine as claimed in claims 1 or 2, wherein valve means is operably located between the exhaust port and the catalyst means, said valve means being operable to vary the timing of the opening of the exhaust port.

8. An engine as claimed in claims 1 or 2, wherein catalyst means extends only partly across the direction of extent of the exhaust port parallel to the axis of the cylinder from that end of the exhaust port that is first exposed during the opening of the exhaust port.

9. An engine as claimed in claims 1 or 2, wherein the catalyst means is located so one end thereof is substantially contigous with the exhaust port, and valve means operatively co-operates with the other end of the catalyst means to restrict the flow of gas from the exhaust port through portion of the catalyst means.

10. A method of operating a two-stroke cycle spark ignited internal combustion engine including introducing a fresh charge of air through an inlet port into a combustion chamber, injecting fuel into the air while it is in the combustion chamber, igniting the combustible mixture so produced, passing exhaust gases from the combustion chamber through an exhaust port to an exhaust system, providing at or adjacent the exhaust port catalyst means having an active catalyst material of a nature to reduce oxides of nitrogen in the gases, contacting the catalyst means with the exhaust gases substantially only from that combustion chamber, and controlling the introduction of the fresh charge of air, the fuel injection and the flow of exhaust gases such that during each open period of the exhaust port of the combustion chamber, the catalyst means is exposed alternately to chemically reducing and chemically oxidizing gases.

11. A method as claimed in claim 10 wherein the catalyst means is exposed to chemically reducing gases during a first part of the open period of the exhaust port and subsequently to chemically oxidizing gases.

* * * * *